(12) United States Patent
Duncan et al.

(10) Patent No.: US 10,318,874 B1
(45) Date of Patent: Jun. 11, 2019

(54) SELECTING FORECASTING MODELS FOR TIME SERIES USING STATE SPACE REPRESENTATIONS

(71) Applicant: Amazon Technologies, Inc., Seattle, WA (US)

(72) Inventors: Gregory Michael Duncan, Bellevue, WA (US); Ramesh Natarajan, Pleasantville, NY (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 14/662,021

(22) Filed: Mar. 18, 2015

(51) Int. Cl.
G06N 5/04 (2006.01)
G06N 7/00 (2006.01)
G06N 20/00 (2019.01)

(52) U.S. Cl.
CPC ............ G06N 5/04 (2013.01); G06N 7/005 (2013.01); G06N 20/00 (2019.01)

(58) Field of Classification Search
None
See application file for complete search history.

(56) References Cited

U.S. PATENT DOCUMENTS

| | | | |
|---|---|---|---|
| 5,815,413 | A | 9/1998 | Hively et al. |
| 7,124,055 | B2 | 10/2006 | Breiman |
| 7,490,287 | B2 | 2/2009 | Sakurai |
| 2006/0217939 | A1 | 9/2006 | Nakata et al. |

OTHER PUBLICATIONS

Lee, et al., Multivariate Time Series Forecasting in Incomplete Environments, Technical Report PARG 08-03, University of Oxford, Dec. 2008, pp. 1-32.*
Lee, et al., Multivariate Time Series Forecasting in Incomplete Environments, Technical Report PARG 08-03, University of Oxford, Dec. 2008, pp. 1-32 (Year: 2008).*
U.S. Appl. No. 15/417,070, filed Jan. 26, 2017, Valentin Flunkert, et al.
U.S. Appl. No. 15/153,713, filed May 12, 2016, Seeger, et al.
http://www.bearcave.com/finance/random_r_hacks/kalman_smooth.html, "Smoothing a Time Series with a Kalman Filter in R", 2013, pp. 1-4.
Nesreen K. Ahmed, et al., "An Empirical Comparison of Machine Learning Models for Time Series Forecasting", Taylor & Francis, Online publication date Sep. 15, 2010, pp. 594-621.

(Continued)

*Primary Examiner* — Wilbert L Starks
(74) *Attorney, Agent, or Firm* — Robert C. Kowert; Meyertons, Hood, Kivlin, Kowert & Goetzel, P.C.

(57) ABSTRACT

Corresponding to each forecasting model of a family of related models for a time series sequence, a respective state space representation is generated. One or more cross-validation iterations are then executed for each model of the family. In a given iteration, a training variant of the time series sequence is generated, with a subset of the time series sequence entries replaced by representations of missing values. Predictions for the missing values are obtained using the state space representation and the training variant, and a model quality metric is obtained based on prediction errors. The optimal model of the family is selected using the model quality metrics obtained from the cross validation iterations.

21 Claims, 9 Drawing Sheets

(56) References Cited

OTHER PUBLICATIONS http://www.mathworks.com/help/ident/ug/estimating-state-space-time-series-models.html, "Estimate StateSpace TimeSeries Models", Download Jan. 25, 2015; pp. 1-2.
http://www.eviews.com/Learning/index.html, "EViews Tutorials", Downloaded Feb. 4, 2015, pp. 1-2.
https://www.estima.com/ratsmain.shtml. "Product Information RATS: Introduction", Estima, Updated Feb. 4, 2015, pp. 1-2.
Siem Jan Koopman, et al., "Statistical algorithms for models in state space using SsfPack 2.2", Econometrics Journal, 1999, pp. 107-160, vol. 2.
Eric Zivot, "State Space Models and the Kalman Filter", Apr. 9, 2006, pp. 1-8.
David Sheung Chi Fung, "Methods for the Estimation of Missing Values in Time Series", Edith Cowan University, 2006, pp. 1-202.
Giovanni Petris, "An R Package for Dynamic Linear Models", Journal of Statistical Software, Oct. 2010, pp. 1-16, vol. 36, Issue 12.
Giovanni Petris, et al., "State Space Models in R", Journal of Statistical Software, May 2011, pp. 1-25, vol. 41, Issue 4.
William R. Bell, "REGCMPNT { A Fortran Program for Regression Models with ARIMA Component Errors", Journal of Statistical Software, May 2011, pp. 1-23, vol. 41, Issue 7.
http://www.mathworks.com/help/ident/ug/whatarestatespacemodels.html, "What Are State-Space Models?", Downloaded Jan. 25, 2015, pp. 1-2.
Eric Zivot, et al., "Time Series Forecasting with State Space Models", University of Washington, Department of Applied Mathematics, 2012, pp. 1-90.
Sy Lvain Arlot, et al., "A survey of cross-validation procedures for model selection", Statistics Surveys, 2010, pp. 4:40-79, vol. 4.
Trevor Hastie, et al., "The Elements of Statistical Learning: Data Mining, Inference, and Prediction", Springer Series in Statistics, pp. 214-217, Second Edition.
C.K. Chu, et al., "Comparison of Two Bandwidth Selectors with Dependent Errors", The Annal of Statistics, 1991. pp. 1906-1918, vol. 19, No. 4.
Hirotugu Akaike. "Fitting Autoregressive Models for Prediction", Annals of the institute of Statistical Mathematics, 1969, p. 243-247, 21(1).
Petar M. Djuric, et al., "Order Selection of Autoregressive Models", IEEE, Nov. 1992, pp. 2829-2833, vol. 40, No. 11.
Ciprian Doru Giurcaneanu, et al., "Estimation of AR and ARMA models by stochastic complexity", Lecture Notes—Monograph Series, 2006, pp. 48-59, vol. 52.
Konstantinos Konstantinides, "Threshold Bounds in SVD and a New Iterative Algorithm for Order Selection in AR Models", IEEE Transactions on signal processing, 1991, pp. 1218-1221.
Clifford M. Hurvich, et al., "Regression and Time Series Model Selection in Small Samples", Biometrika, Jun. 1989, pp. 297-307, vol. 76, No. 2.
Tetiana Stadnyiska, et al., "Comparison of automated procedures for ARMA model identification", Behavior Research Methods, 2008, pp. 250-262, vol. 40 No. 1.
Rob J. Hundman, et al., "Automatic time series forecasting: the forecast package for R", Monash, University, Department of Econometrics and Business Statistics, Jun. 2007, pp. 1-29.
Robert H. Shumway, et al., "Time Series Analysis and Its Applications With R Examples", Springer Science & Business Media, 2010, 1-171; 559-576.
G. Gardner, et al., "Algorithm AS 154: An Algorithm for Exact Maximum Likelihood Estimation of Autoregressive-Moving Average Models by Means of Kalman Filtering", Applied Statistics, 1980, pp. 311-322, vol. 29, Issue 3.
David S. Stoffer, et al., "Bookstrapping State-Space Models: Gaussian Maximum Likelihood Estimation and the Kalman Filter", Journal of the American Statistical Association, 1991, pp. 1024-1033, vol. 86, No. 416.
Andrew C, Harvey, et al., "Diagnostic Checking of Unobserved-Components Time Series Models", Journal of Business & Economic Statistics, Oct. 1992, pp. 377-389, vol. 10, No. 4.
Giovanni Petris, et al., "Dynamic Linear Models with R", Springer, May 2009, pp. 31-32.
Hui Zou, et al., "Regularization and variable selection via the elastic net", Journal of the Royal Statistical, Dec. 2003, pp. 301-320.
Andrew Harvey, "Forecasting with Unobserved Components Time Series Models", Handbook of Economic Forecasting, 2006, pp. 1-89.
James Durbin, et al., "Time Series Analysis by State Space Methods", Oxford University Press, May 2012, pp. 1-9.
Leonard J. Tashman, "Out-of-sample tests of forecasting accuracy: an analysis and review", International Journal of Forecasting, 2000, pp. 437-450, vol. 16, No. 4.
J. Rissanen, "Modeling by Shortest Data Description", Automatica, 1978, pp. 465-471, vol. 14, No. 5.
Mati Wax, "Order Selection for AR Models by Predictive Least Squares", IEEE Transactions on Acoustics, Speech, and Signal Processing, Apr. 1988, pp. 581-588, vol. 36, No. 4.
James R. Dickie, et al., "A comparative study of AR order selection methods", Signal Processing, Jan. 13, 1994, pp. 239-255, vol. 40, No. 2.
Piet De Jong, "The likelihood for a state space model", Biometrika, 1988, pp. 165-169, vol. 75, No. 1.
Robert Kohn, et al., "Estimation, Prediction, and Interpolation for ARIMA Models With Missing Data", Journal of the American Statistical Association, Sep. 1986, pp. 751-761, vol. 81, No. 395.
U.S. Appl. No. 15/458,645, filed Mar. 14, 2017, Andrew Christopher Chud.
U.S. Appl. No. 15/441,896, filed Feb. 24, 2017, Jan Alexander Gasthaus et al.
Xiangrui Meng, et al., "MLlib: Machine Learning in Apache Spark", Journal of Machine Learning Research 17, 2016, pp. 1-7.
Martin Jaggi, et al., "Communication—Efficient Distributed Dual Coordinate Ascent", Retrieved from URL: http://arxiv.org/abs/1409.1458v2, pp. 1-15.
Alexander Alexandrov, et al., "The Stratosphere platform for big data analytics", The VLDB Journal, Published online May 6, 2014, Springer, pp. 1-26.
Mikhail Bilenko, et al., "Towards Production-Grade, Platform-Independent Distributed ML", Proceedings of the 33rd International Conference on Machine Learning, 2016, pp. 1-5.
Matthias Seeger, et al., "Bayesian Intermittent Demand Forecasting for Large Inventories", 30th Conference on Neural Information Processing Systems (NIPS 2016), 2016, pp. 1-9.
Ronnie Chaiken, et al., "SCOPE: Easy and Efficient Parallel Processing of Massive Data Sets", PVLDB '08, Aug. 23-28, 2008, ACM, pp. 1265-1276.
Yossi Arjevani, et al., "Communication Complexity of Distributed Convex Learning and Optimization", Retrieved from URL: http://arxiv.org/abs/1506.01900v2, pp. 1-27Tim Kraska, et al., "MLbase: A Distributed Machine-learning System", CIDR 2013, 6th Biennial Conference on Innovative Data Systems Research, pp. 1-7.
Tim Kraska, et al., "MLbase: A Distributed Machine-learning System", CIDR 2013, 6th Biennial Conference on Innovative Data Systems Research, pp. 1-7.
Abhay Jha, et al., "Clustering to Forecast Sparse Time-Series Data", 2015 IEEE 31st International Conference, 2015, pp. 1388-1399.
"ISF 2014 Economic Forecasting—Past, Present and Future", Foresight Fall 2013, Issue 31, The International Journal of Applied Forecasting, 2013, pp. 1-56.
Vinayak Borkar, et al., "Hyracks: A Flexible and Extensible Foundation for Data-Intensive Computing", Data Engineering (ICDE), 2011 IEEE 27th International Conference, pp. 1151-1162.
"KeystoneML", Retrieved from URL: http://keystoneml.org/index.html on Jan. 10, 2017, pp. 1-4.
Arun Kumar, et al., "Model Selection Management Systems: The Next Frontier of Advanced Analytics", ACM SIGMOD, Record 44.4, 2016, pp. 17-22.
Jimmy Lin, et al., "Large-Scale Machine Learning at Twitter", SIGMOD '12, May 20-24, 2012, pp. 793-804.
Amazon Web Services, "Amazon Machine Learning Developer Guide Version Latest", Updated Aug. 2nd, 2016, pp. 1-146.

(56) References Cited

OTHER PUBLICATIONS

CE Zhang, et al., "Materlialization Optimizations for Feature Selection Workloads", SIGMOD '14, Jun. 22-27, 2014, pp. 1-12.
Cheng-Tao Chu, et al., "Map-Reduce for Machine Learning on Multicore", In Advances in Neural Information Processing Systems, 2007, pp. 281-288.
Matei Zaharia, et al., "Resilient Distributed Datasets a Fault-Tolerant Abstraction for In-Memory Cluster computing", amplab UC Berkeley, 2012, pp. 1-30.
Matei Zaharia, et al., "Resilient Distributed Datasets a Fault-Tolerant Abstraction for In-Memory Cluster Computing", Proceedings of the 9th USENIX Conference on Networked Systems Design and Implementation, pp. 1-30.
Matthias Boehm, et al., "Hybrid Parallelization Strategies for Large-Scale Machine Learning in SystemML", Proceeding of the VLDB Endowment, vol. 7, No. 7, 40th International Conference on Very Large Data Bases, Sep. 1-5, 2014, pp. 553-564.
Yucheng Low, et al., "Distributed GraphLab: A Framework for Machine Learning and Data Mining in the Cloud", The 38th International Conference on Very Large Data Bases, Aug. 27-31, 2012, pp. 716-727.
Fabian Pedregosa, et al., "Scikit—learn" Machine Learning in Python, Journal of Machine Learning Research 12, 2011, pp. 2825-2830.
D. Sculley, et al., "Hidden Technical Debt in Machine Learning Systems", In Advances in Neural Information processing Systems, 2015, pp. 2503-2511.
Michael Armbrust, et al., "Spark SQL: Relational Data Processing in Spark", ACM, SIGMOD '15, May 31-Jun. 4, 2015, pp. 1-12.
Amol Ghoting, et al., "SystemML: Declarative Machine Learning on MapReduce", In Data Engineering (ICDE), 2011 IEEE 27th International Conference on, pp. 231-242.

* cited by examiner

SELECTING FORECASTING MODELS FOR TIME SERIES USING STATE SPACE REPRESENTATIONS

BACKGROUND

For many kinds of business and scientific applications, the ability to generate accurate forecasts of future values of various measures (e.g., retail sales, or demands for various types of goods and products) based on previously collected data is a critical requirement. The previously collected data often consists of a sequence of observations called a "time series" or a "time series data set" obtained at respective points in time, with values of the same collection of one or more variables obtained for each point in time (such as the daily sales generated at an Internet-based retailer). Time series data sets are used in a variety of application domains, including for example weather forecasting, finance, econometrics, medicine, control engineering, astronomy and the like.

The process of identifying a forecasting model for a time series often includes fitting certain structured time series models (or combinations of such models), e.g., autoregressive models, moving average models, periodic/seasonal models, or regression models. Often, a particular modeling/forecasting methodology is selected, and several different specific models that use the same methodology or have the same general structure (but differ from each other in one or more model parameters) are then generated. One is then faced with the problem of selecting a particular model of the family as the best or optimal model.

For time series models, it is common to use a metric such as the value of maximum likelihood, obtained at the fitted estimates of the parameters, to compare the various models of the family. The optimal model is then selected using the "best" value of the metric (where the definition of "best" may vary depending on the metric selected). However, this approach is not always reliable. If log likelihood is being used as the metric, for example, more complex models in the model family (where model complexity is measured in terms of the number of parameters in the model) will often tend to have a higher log likelihood score. However, such complex models, while appearing superior on the basis of the metric selected, may sometimes perform relatively poorly with respect to forecasting accuracy, e.g., due to over-fitting on the training data. A number of ad hoc approaches to the problem of model selection in the time series context have been devised (e.g., by adjusting log likelihood values to penalize more complex models), typically without yielding a sound general solution.

Figure 1:
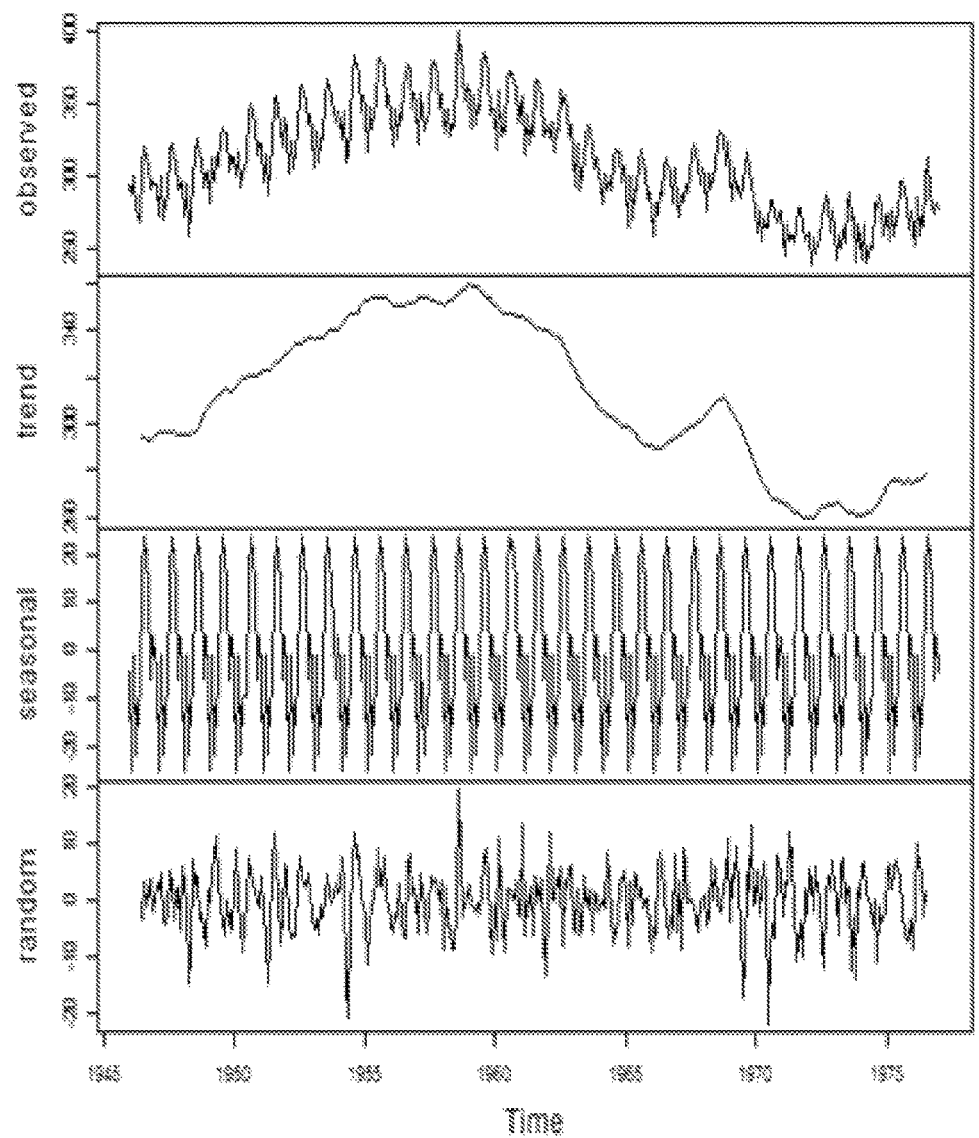
FIG. 1 illustrates an example of a time series sequence and its decomposition into trend, seasonal and random components, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for selecting optimal or superior forecasting models for time series data from a group of related forecasting models using state space representations in combination with cross-validation are described. Numerous types of structured modeling techniques have been developed for time series, including, for example, autoregressive modeling, moving average modeling, seasonal modeling, periodic modeling, regression modeling, exponential smoothing modeling, unobserved components modeling, and various combinations thereof. In many scenarios, a family of related models using one or more of the structured modeling approaches is first generated for a given time series sequence (TSS), with the member models of the family differing from one another in their model parameters. For example, member models could use different numbers of model parameters, or differ from one another in one or more initial values, regularization parameters, and so on. (Regularization parameters may be used, for example, to introduce additional information into a model for preventing or reducing over-fitting.) A plurality of such related models may be generated, instead of stopping at just one model, because in general it may be hard to pre-select the set of parameters that will tend to provide the most accurate forecasts. After the model family has been generated, one among them may be selected as the "best" (e.g., in terms of some metric indicative of the expected accuracy of its forecasts), and that optimal model may subsequently be used for forecasting.

Unfortunately, some conventional approaches to selecting optimal forecasting models from among such model families for time series data have not proved adequate. The metrics (e.g., likelihood measures) typically used to rank the models may improve as the complexity (e.g., the number of distinct parameters used) of the structured model increases. However, more complex models tend to be over-fitted—that is, while they may sometimes make excellent predictions on the training data set, they may make relatively poor predictions for new data sets (data sets that have not been used for training).

In at least some embodiments, therefore, a different approach towards selection of optimal models may be used, which relies on generating "state space" representations or formulations of the members of a model family, and then applying any of various forms of cross-validation. Generally speaking, in the state space approach, time series observations of a given sequence are assumed to depend (e.g., linearly) on a state vector that is unobserved and is generated by a stochastically time-varying process. That is, the time series observations are assumed to be the product of a dynamic system. The observations are further assumed to be subject to measurement error that is independent of the state vector. The state vector may be estimated or identified once a sufficient set of observations becomes available. A variety of state space representations may be used in different embodiments. In one representation, called the "general linear Gaussian" state space model, for example, the observations $y_t$ of an n-dimensional observation sequence $y_1, y_2, \ldots, y_n$ are expressed in terms of a state vector $\alpha_t$ as follows:

$$y_t = Z_t \alpha_t + \varepsilon_t, \quad \varepsilon_t \sim NID(0, H_t) \quad \text{[Equation 1]}$$

$$\alpha_{t+1} = T_t \alpha_t + R_t \eta_t, \quad \eta_t \sim NID(0, Q_t), \quad t = 0, 1, \ldots, n \quad \text{[Equation 2]}$$

Equation 1 is called the "observation equation" or "measurement equation" in this state space representation (SSR), while Equation 2 is called the "state equation" or "transition equation". $Z_t$, $H_t$, $T_t$, $R_t$ and $Q_t$ are known as "system matrices" of the SSR. $\varepsilon_t$ and $\eta_t$ are known as "disturbance vectors", with normally and independently distributed values as indicated by the "NID" notation. It is noted that the manner in which the general linear Gaussian model is expressed (i.e., in terms of the symbols used and the names of the variables and matrices) may differ from one statistical reference publication or tool to another. Based on various assumptions regarding the vectors ($\alpha_t$, $\varepsilon_t$ and $\eta_t$) and system matrices $Z_t$, $H_t$, $T_t$, $R_t$ and $Q_t$, a number of different state space representations corresponding to various time series models may be obtained. Modules/functions that can be used for generating SSRs corresponding to commonly-used structured time series models (e.g., autoregressive, moving average, periodic, exponential smoothing and/or regression models) may, at least in some cases, already be provided in various statistics tools and packages. For example, the "arima" function of the "stats" package of the "R" statistical computing environment, used for autoregressive integrated moving average (ARIMA) modeling, can be used to generate an SSR corresponding to an ARIMA model. In some embodiments, existing tools may be modified to enable the generation of SSRs, or new tools may be created. In various embodiments, a particular type of state space representation, called the "innovations" (or "innovation") form may be used for performing cross-validation iterations of the type described below. (The term "innovation", when used in a statistics context, refers to the difference between the observed value of a variable at time t, and the optimal forecast of that value based on information available prior to time t.)

Cross-validation is a common statistical model evaluation technique for assessing how a model will generalize to new or "unseen" data (i.e., data that were not used to generate or train the model). One or more rounds or iterations of cross-validation may typically be performed, in each of which an observation data set is split into a training subset and a test subset (typically using random selection). The model is trained using the training subset and the quality of the model's predictions is evaluated using the test subset (e.g., quality metrics based on the errors in predicting the test set values may be obtained). Metrics of model quality obtained from the different cross-validation iterations may then be aggregated in various ways (e.g., the mean value and/or confidence intervals of the quality metric may be obtained) to arrive at a final quality metric for the model. An important assumption typically underlying the successful use of cross-validation is that the observation data points that are to be split into the training and test subsets are assumed to be independent of each other, so that, for example, there are no patterns or correlations in the observation data set that have to captured and replicated in the test and training sets. However, such assumptions are typically not met by time series data. A time series typically has a certain sequential structure, so that individual observations are not independent and identically distributed, but rather are strongly correlated at certain lags. Non-stationary behavior including drift and aperiodicity is often exhibited in time series sequences. In general, therefore, it may not be possible to maintain this correlation and drift structure in individual subsequences of the original time series that are extracted for the purposes of cross-validation.

In contrast, state space representations of the time series models of a family are typically better suited for cross-validation techniques than the baseline models themselves. In at least some innovations-form state space approaches, observations of a sequence may be modeled as being added one at a time, with the equations being updated in response to the addition of each observation. Estimating and smoothing computations may thus be performed continually as new observations are received. As a result, such state space representations may be used to predict missing values from a time series sequence, and this feature may be used in the following approach towards cross-validation.

According to at least some embodiments, respective state space representations (SSRs) corresponding to each forecasting model of a family of forecasting models may be generated. For example, if a family F comprising models (f1, f2, . . . , fn) is generated or trained using a time series sequence TSS, a corresponding set of SSRs (SSR_f1, SSR_f2, . . . SSR_fm) may be generated. One or more cross-validation iterations may then be performed for each model of the family in some embodiments using the SSRs. For each iteration, the original time series sequence may be split into two variants: a training variant, in which a subset of TSS entries is replaced by representations of missing values (e.g., by a symbol indicating that the entry's value is "not available" or "N/A"), and a test variant, complementary to the training variant. For example, if the TSS had 10000 entries, one training variant may comprise 7000 of the TSS entries and 3000 N/As at randomly-selected positions, while the test variant may comprise the 3000 observations for which N/As were introduced in the training variant. Using the training variant and the SSR for the model being considered, predictions for the test variant entries may be obtained in various embodiments. In at least one embodiment, the SSR and the training variant may be used to obtain an estimate of an intermediary set of "optimal" parameter values, which can then be used with the forecasting model to obtain predictions for the test variant entries. A quality metric (corresponding to the particular cross-validation iteration) for the forecasting model may then be obtained in various embodiments. For example, in some implementations, likelihood (or log likelihood) metrics may be obtained. Other quality metrics, such as a one-step ahead mean squared forecast error (1-MSFE) metric, a k-step ahead mean squared forecast error (k-MSFE) metric, or a one-step ahead mean absolute forecast percentage error (1-MAFPE) may be used in other embodiments. Respective quality metrics may thus be obtained for each of several cross-validation iterations. The different quality metrics may then be aggregated in various embodiments (e.g., by computing the mean value of the metric and/or confidence intervals) to arrive at an overall or summary quality metric for the particular forecasting model for which the cross-validation iterations were run. Similar cross-validation iteration sets may be performed for all the models of the family, and the optimal model from the family may then be selected based on a comparison of the summary quality metrics corresponding to each of the models in at least some embodiments. The optimal model may then be used for subsequent forecasting. Of course, once an optimal model has been identified, it may be used for various other purposes as well, such as determining the sensitivity of the model output variable(s) to variations in particular parameters, determining the relative influence or impact of different parameters and input variables, and so on. In at least one embodiment, the optimal forecasting model may be selected based at least in part on a parsimony criterion—that is, if the values of the quality metrics for two models are within some selected statistical or absolute range of each other (such as within one standard error), the model with the smaller count of parameters may be considered the superior of the two models.

Any of a number of approaches may be taken in different embodiments with respect to the number of cross-validation iterations that are performed. In some cases, K-fold cross-validation may be used, in which the TSS is randomly partitioned into K (typically equal-sized, or nearly equal-sized) subsamples, with each subsample being used as the test data for one iteration (and the remaining K−1 subsamples being used as the training data). In another approach called "leave-p-out" exhaustive cross-validation which may be employed in one embodiments, p observations of the TSS are used as the test set in each iteration, and the remaining observations form the training set. This is repeated, using a different p-sized subset as the test set for subsequent iterations, until all possible ways of selecting the p observations from the TSS have been exhausted. (Of course, if p is set to 1, leave-p-out becomes identical to K-fold cross-validation with K set to the number of observations in the TSS.) Other approaches, such as repeated random sub-sampling validation (in which test and training set data points may be selected at random, without necessarily ensuring that each observation is included exactly once in either a test set or a training set in any given iteration) may be used in other embodiments.

The cross-validation technique described above may be implemented in computing environments that support parallel processing in some embodiments. For example, in one embodiment, a machine learning service or a statistical computing service may be implemented at a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. The machine learning service may include numerous computation engines (e.g., physical and/or virtual machines), with each engine comprising one or more threads of execution. A large number of computation engines spread over numerous geographically-dispersed data centers may be used for machine learning tasks or statistical computing tasks in some provider networks. Respective computation engines, or respective threads of execution at one or more computation engines, may be assigned to respective sets of cross-validation runs in some implementations. For example, if a model family comprises models f1 and f2, and 10-fold cross-validation is to be performed for each model, the ten cross-validation iterations for f1 may be assigned to one computation engine, while the ten cross-validation iterations for f2 may be assigned to another engine. In one implementation, among the ten cross-validation iterations to be performed for a given model, several (or all) may be performed in parallel on different computation engines or different threads of execution. In at least one embodiment, the SSR-based cross-validation approach may be applied to real-time data, e.g., streaming data collected at a computation engine of a machine learning service via a programmatic interface. In some embodiments, the model selection technique may also be implemented as a function or package bundled within a statistical computing tool which can be run on various types of computing devices (such as laptops, tablets, or desktops, for example).

Example Time Series Data

A concrete example of a time series data set may be helpful in understanding some of the characteristics of time series that lead to the development of the SSR-based cross-validation technique described in further detail below. FIG. 1 illustrates an example of a time series sequence and its decomposition into trend, seasonal and random components, according to at least some embodiments. The data points plotted in the "observed" portion at the top of FIG. 1 represent the number of live births (in thousands) recorded in each successive month in the United States from 1948 to 1979. The raw data was obtained from the "birth" subcomponent of the Applied Statistical Time Series Analysis ("astsa") package of version 3.1.2 of the R statistical computing environment.

As is evident from the "observed" portion of FIG. 1, the displayed time series sequence exhibits a number of temporal patterns. For example, there seems to be some amount of seasonal variation (not too different from year to year), with a peak in the summer months and a trough in the winter months. The random fluctuations in the data appear to be roughly equal in size over the time range. As a result, an additive model may be used to describe the data. In an additive model, the observed time series is assumed to be the sum of a plurality of independent components, such as (in the example shown in FIG. 1) a trend component, a seasonal component, and a random or irregular component. In contrast, if the amplitude of the seasonal variations and/or random fluctuations change substantially over time, a multiplicative model may be used (in which the observed values are assumed to be the product of the components rather than the sum), or the time series data may be transformed (e.g., using logarithms) to conform to the additive modeling methodology.

The lower three curves shown in FIG. 1, labeled "trend", "seasonal" and "random" represent respective estimates for the three subcomponents obtained using the "decompose( )" function in R, under the assumption that the TSS was suitable for an additive model. Plotting the estimates of the components separately as in FIG. 1 may be helpful in developing overall intuitions about the variations in the data over time. A family of forecasting models from which one model is to be selected as optimal in various embodiments may incorporate separate sets of parameters covering the kinds of components shown in FIG. 1. For example, in R, an "order" parameter of the "arima" function includes three integer values representing a specification of the non-seasonal part of the model, while a "seasonal" list parameter represents a specification of the seasonal components of the model. A member of a family of ARIMA models may differ from other members of the family in the specific combination of "order" and "seasonal" parameter settings, for example. In such a scenario, the cross-validation technique described herein may be used to select the combination of "order" and "seasonal" parameter values that is likely to result in the most accurate forecasts.

Time Series Analysis Overview

Figure 2:
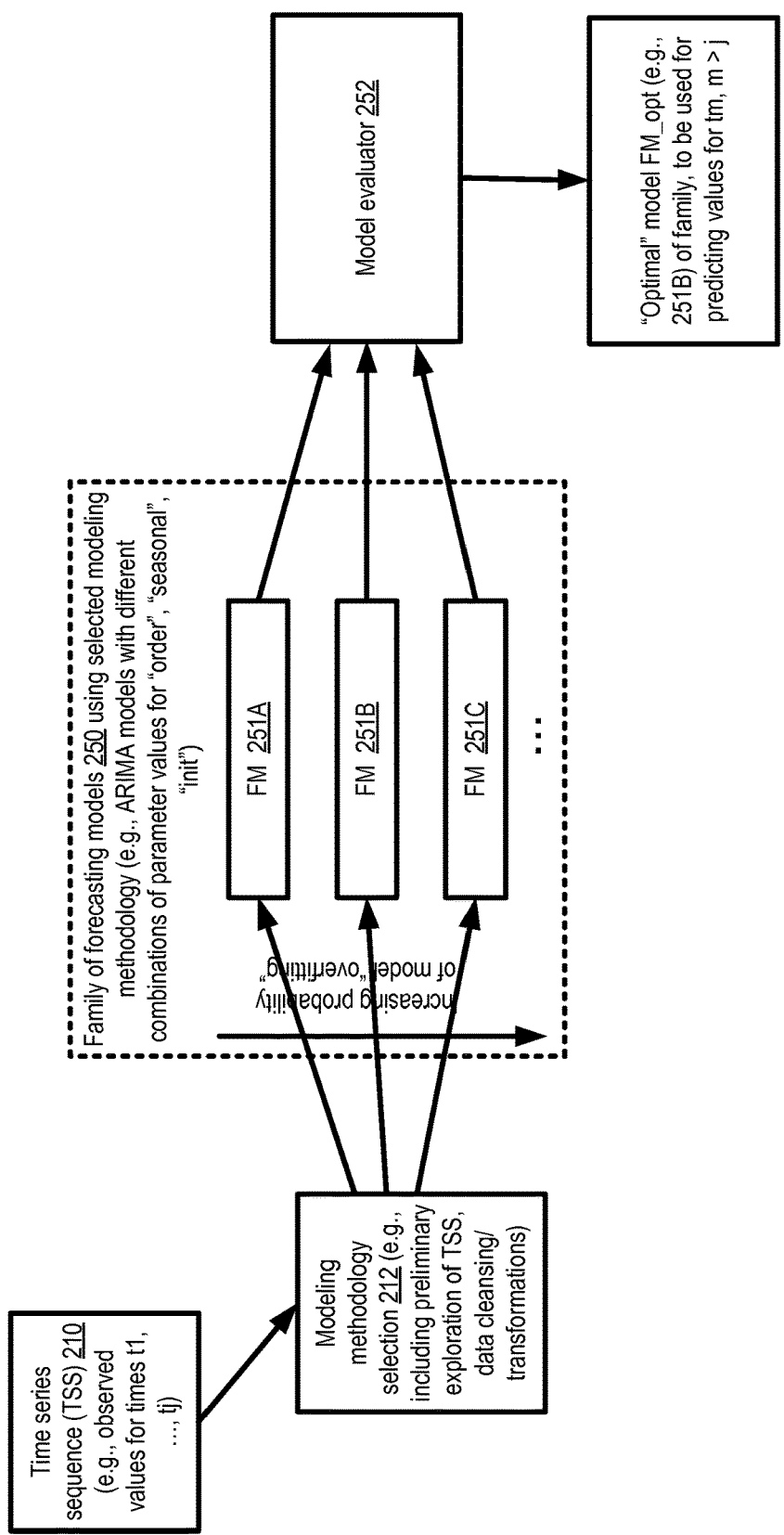
FIG. 2 illustrates a high-level overview of steps that may be included in the analysis of time series sequences, according to at least some embodiments.

FIG. 2 illustrates a high-level overview of steps that may be included in the analysis of time series sequences, according to at least some embodiments. A time series sequence (TSS) 210 comprising observations for j points in time ($t_1$, $t_2$, ..., $t_j$) may be collected. To simplify the presentation, the time series sequence examples discussed in much of the following description are assumed to consist of univariate observations (that is, each observation consists of a value of one variable). In general, however, each observation of a TSS may include values of one or more variables, and the cross-validation based technique described herein may be applied in various embodiments regardless of the number of variables per observation.

In a modeling methodology selection portion 212 of the analysis, the observations may be explored briefly (e.g., by an automated tool of a machine learning service, or by a data scientist). The data points may be plotted, for example, and compared to plots of previously analyzed time series sequences, or summary statistical metrics may be obtained to identify similarities to other time series. In some cases, the data may be cleansed or transformed in this first phase (e.g., by rejecting outlying observations that appear to be erroneous, obtaining logarithms of the data values, inserting acceptable symbols such as "N/A" for missing values, etc.). In some implementations, the collection of the TSS observations may be completed before the selection of the modeling methodology is begun. In other implementations, the TSS may comprise a real-time stream of data points (e.g., measurements collected from various sensor devices and transmitted to a machine learning service via the Internet) which continue to arrive even after the modeling methodology is selected on the basis of the preliminary analysis of a subset of the data.

After a modeling methodology is selected, a family of forecasting models 250 may be generated in the depicted embodiment. The family 250 may include a plurality of individual forecasting models such as 251A, 251B, 251C, which differ from one another in one or more parameter values. For example, in the case of a family of ARIMA models implemented in R, FM 251A may have a different setting for the "order" parameter than FM 251B, and FM 251B may have a different setting for an initial value parameter "init" than FM 251C, and so on. Regularization-related parameters may differ from one model to the other of a family 250 in some embodiments. The number of model parameters for which non-null values or non-default values have been selected may differ from one model of the family to another in some embodiments. As mentioned earlier, a plurality of related models, all using the same methodology but with different parameter settings, may be generated because it may not be straightforward to select the parameter settings that are likely to provide the most accurate forecasts for the TSS 210.

The member models of family 250 may then be compared to each other using any combination of various criteria in the depicted embodiment, e.g., by a model evaluator module 252. As described below with respect to FIG. 3, in various embodiments the model evaluation procedure may comprise generating state space representations or formulations of the models of family 250, followed by one or more cross-validation iterations using the SSRs. Respective quality metrics obtained for the individual models 251 during model evaluation may be used to identify an optimal model FM_opt which may subsequently be used for forecasting purposes. In some embodiments in which the data points of the TSS 210 continue to arrive (e.g., in the form of a streaming real-time data feed) after an optimal model is initially identified, at least some of the analysis steps illustrated in FIG. 2 may be repeated in multiple iterations (especially if the forecasts obtained using the initially-selected optimal model are found to be insufficiently accurate).

Optimal Model Selection Using Cross-Validation and SSRs

Figure 3:
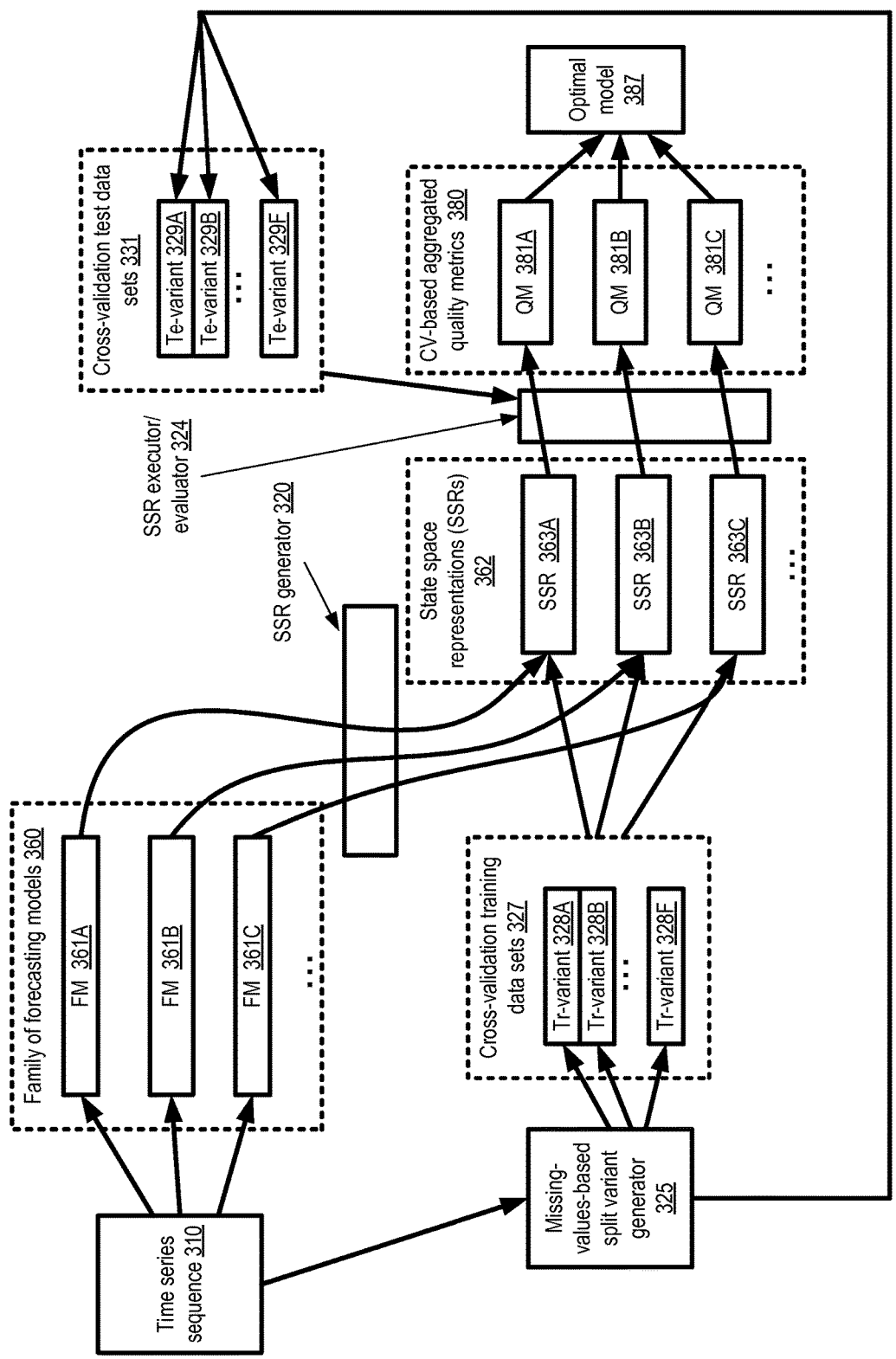
FIG. 3 illustrates an example technique for the selection of optimal forecasting models for time series from a family based on cross-validation using state space representations (SSRs) of the family members, according to at least some embodiments.

FIG. 3 illustrates an example technique for the selection of optimal forecasting models from a family of models based on cross-validation using state space representations (SSRs) of the family members, according to at least some embodiments. As shown, a family of forecasting models 360, such as forecasting models (FM) 361A, 361B and 361C may be generated for a time series sequence 310, e.g., after the kind of preliminary data exploration discussed with reference to FIG. 2. Any of a number of different modeling methodologies may be used to generate the FMs 361 in different embodiments, such as ARIMA, static or dynamic regression, exponential smoothing, unobserved component modeling, and so on. The FMs 361 may differ from each other in model parameters—e.g., in the number of distinct model parameters for which non-default or non-null values are set, one or more initial value parameters, regularization parameters, and so on.

For each member of the model family 360 in the depicted embodiment, state space representation (SSR) generator 320 may create a respective SSR: e.g., SSRs 363A-363C may be created corresponding to FMs 361A-361C respectively. In at least some embodiments, the SSRs may be expressed in the innovations form. A number of different techniques may be used to obtain the SSRs in different embodiments. In some cases, a statistical programming environment such as R may include built-in modules or functions for generating various kinds of SSRs. Examples of such functions include the aforementioned arima function, the dlm (dynamic linear modeling) package, the KFAS (Kalman Filter and Smoother for Exponential Family State Space Models) package, and the like. In some cases external SSR-generating modules may have to be linked to the programming environment being used, or a separate program specifically designed for SSR generation may be used. In at least some embodiments, an existing statistical programming environment may be extended to include or enhance SSR-related features.

From the original TSS 310, a set of one or more training sets and test sets for cross-validation using the SSRs 363 may be created, e.g., by a missing-values-based split variant generator 325. To create a pair of training and test data sets, the split variant generator 325 may first store, in a copy of TSS, representations of missing values in place of a selected subset of the elements of TSS 320 in the depicted embodiment. That is, the original TSS (assumed to be fully populated at this stage of the analysis, with no missing values to begin with) may be modified to appear as though some selected number of its observations were missing, and this version of the TSS may be used as a training variant (Tr-variant) 328. Another copy of the original TSS, which comprises those values which were replaced in the Tr-variant, and includes missing values in the remaining positions, may be designated as the corresponding test variant (Te-variant) 329. Thus, for example, cross-validation training data sets 327 may comprise Tr-variants 328A-328F, while the corresponding test data sets 331 may comprise Te-variants 329A-329F. The number of training and test data sets created and/or the manner in which the training set entries and test set entries are selected from the original TSS may differ in various embodiments, based on the particular cross-validation approach (e.g., K-fold cross-validation, leave-p-out cross-validation, etc.) being used. An example of the detailed steps that may be used to generate K-fold cross-validation training and test sets is provided in FIG. 4a and FIG. 4b and discussed below.

In each cross-validation iteration for each model 361 being evaluated, an SSR executor/evaluator module 324 may utilize one Tr-variant 328 and the SSR of the model to generate predicted values for the elements of the Tr-variant which had been replaced by missing value representations. The predicted values may then be compared with the corresponding test variant Te-variant 329 to obtain an iteration-specific quality metric for the cross-validation iteration. In at least one embodiment, the SSR may be used to estimate one or more optimal parameter values for the corresponding FM, and the optimal parameter values may then be used to obtain the predictions. In embodiments in which multiple cross-validation iterations are performed, the metrics for the individual iterations may then be combined (e.g., by obtaining a mean value and/or a confidence interval) to obtain an aggregated measure of the quality of the corresponding FM 361. For example, the cross-validation based aggregated quality metrics 380 in FIG. 3 include QM 381A corresponding to FM 361A (and its SSR 363A), QM 381B corresponding to FM 361B and SSR 363B, and QM 381C corresponding to FM 361C and SSR 363C. It is noted that in some embodiments, only a single cross-validation iteration may be executed for each model, in which case the aggregation of the iteration-specific quality metrics would not be required. Any of a variety of quality metrics may be used in different embodiments, such as likelihood or log-likelihood, one-step ahead mean squared forecast error (1-MSFE), k-step ahead mean squared forecast error (k-MSFE), or one-step ahead mean absolute forecast percentage error (1-MAFPE). The QMs 381 corresponding to the different models may be compared, and the optimal model 387 may be selected based at least in part on the comparison. Depending on the type of QM selected, higher QM values may indicate higher quality, or lower QM values may correspond to higher quality. In some embodiments, instead of relying simply on the aggregated QM values, a parsimony criterion may also be used to determine the optimum. If the QM values for a group of two or more FMs are reasonably close (e.g., within one standard error) with respect to each other, and superior to the QM values of the remaining FMs, the least complex or most "parsimonious" model in the group (such as the one with the fewest number of parameters) may be designated as the best model of the group. The optimal model 387 may subsequently be utilized for obtaining forecasts for some or all of the variables represented in the TSS 310. Of course, in some scenarios it may be the case that no single model may stand out as the best, either on the basis of the QMs alone or on the basis of QMs combined with secondary criteria such as parameter count parsimony. In such a scenario, if a group of FMs appear to be of equal quality and equally complex, one may be selected at random as the optimal model in some embodiments.

Example of K-Fold Cross-Validation Steps

Figure 4A:
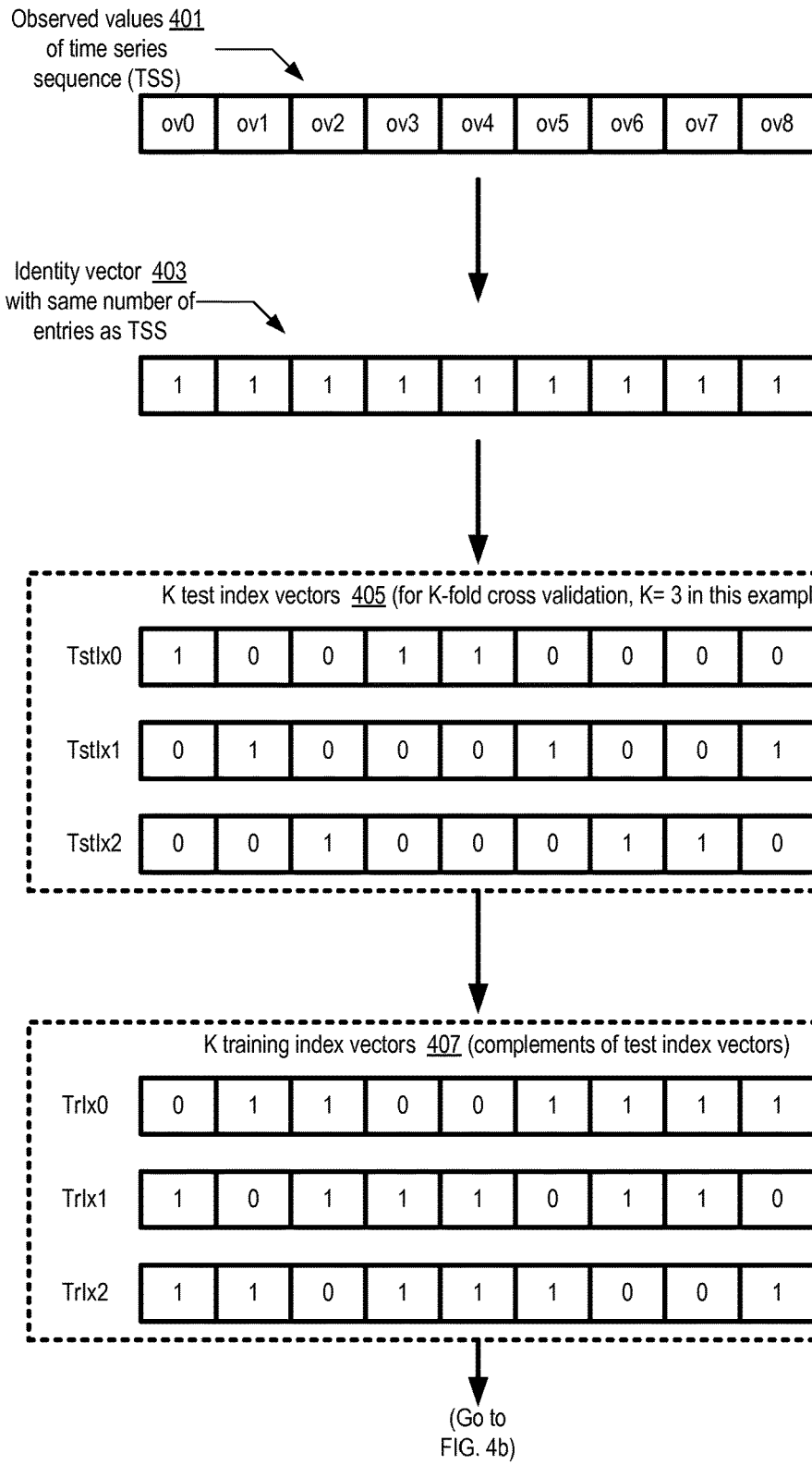
FIG. 4a and FIG. 4b illustrate example operations that may be performed during a K-fold cross-validation using an SSR of a forecasting model, according to at least some embodiments.
Figure 4B:
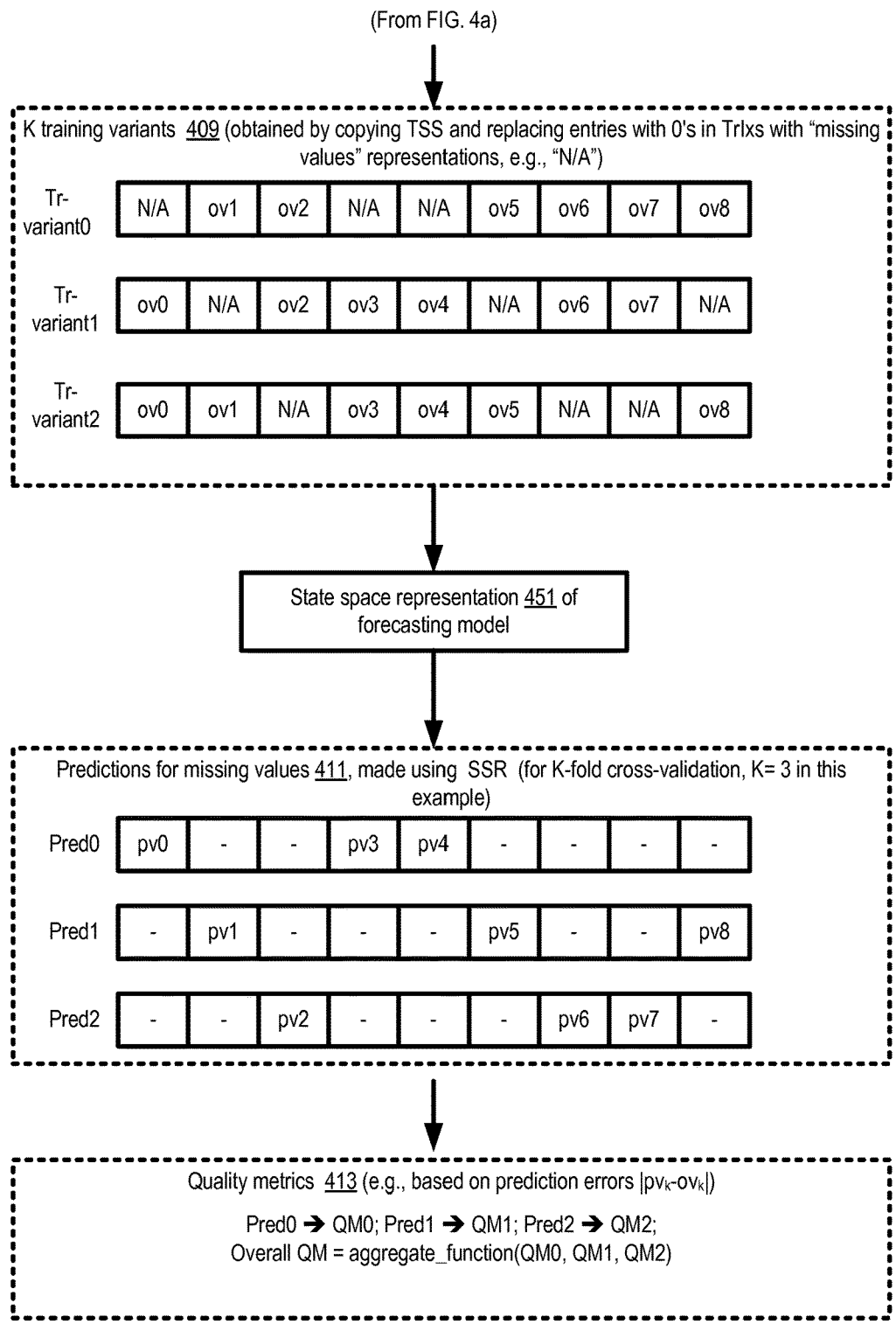

FIG. 4a and FIG. 4b illustrate example operations that may be performed during a K-fold cross-validation using an SSR of a forecasting model, according to at least some embodiments. A very simple TSS with just nine single-variable observations is used to illustrate the technique; in practice, TSSs may often contain thousands of observations for many different variables. The observed values 401 of the example TSS include ov0-ov8, corresponding to nine measurement times, with ov0 representing the earliest measurement and ov8 representing the latest measurement.

An identity vector 403 (a vector with the value "1" in all its entries) may be created with the same number of entries (nine) as the TSS in the depicted embodiment. In the illustrated scenario, 3-fold cross-validation is shown by way of example; in practice, the number of folds may be selected on the basis of various heuristics, a best practices knowledge base, available computational resources, and/or other factors. For 3-fold cross-validation, three test index vectors 405 (TstIx0, TstIx1, and TstIx2) may be created, each of the same length as the identity vector 403, and each comprising a selected number of 1-valued entries (entries containing "1") and "0"s in the remaining entries. The number of 1-valued entries in each of the test index vectors may be computed in the depicted embodiment by dividing the number of entries in the identity vector (nine) by the number of folds (three). In scenarios in which the number of entries is not an exact multiple of the number of folds, one of the test index vectors may include a few extra 1-valued entries. The particular positions or slots within the test index vectors which are 1-valued may be selected at random in some implementations, as long as no two test index vectors contain "1"s in the same positions. (It is noted that in other approaches towards cross-validation, such as repeated random sub-sampling validation, the requirement that no two test index vectors have overlapping 1-values may not apply.)

A set of training index vectors 407 may be obtained by generating the complements of the test index vectors in the depicted embodiment. For example, training index vector TrIx0 contains "0"s in the positions of TstIx0 which have "1"s and "1"s in the positions of TstIx0 which have "0"s. Similarly, TrIx1 contains the complements of the "1"s and "0"s of TstIx1, and TrIx2 contains the complements of the "1"s and "0"s of TstIx2.

The training index vectors 407 may then be used to obtain training variants 409 of the original TSS in various embodiments, as shown in FIG. 4b. A training variant may comprise: (a) in each 1-valued position of the corresponding training index vector, the corresponding original observed value of the TSS, and (b) in each 0-valued position of the corresponding training index vector, a representation of a missing value. Thus, for example, training index vector TrIx0 contains "1"s in index positions 1, 2, 5, 6, 7, and 8, and "0"s in index positions 0, 3, and 4. Accordingly, the corresponding training variant Tr-variant0 includes the "N/A"s in index positions 0, 3 and 4, and the original observed values (ov1, ov2, ov5, ov6, ov7 and ov8) in the index positions 1, 2, 5, 6, 7 and 8. The training variants 409 may be used together with the SSR 451 of the forecasting model being evaluated to obtain estimates or predictions 411 for the missing values. For example, predicted values pv0, pv3 and pv4 of prediction set pred0 may respectively be generated for the original observed values ov0, ov3 and ov4 using training variant Tr-variant0, predicted values pv1, pv5 and pv8 of pred1 may be generated using training variant Tr-variant1, and so on. Respective quality metrics 413 QM0, QM1, and QM2 may be generated based on the accuracy of each of the prediction sets Pred0, Pred1, and Pred2 in the depicted embodiment. The individual quality metrics obtained for each of the training/test combinations may then be combined (e.g., using the mean or some other selected aggregation function or functions) to arrive at an overall quality metric QM. The overall QMs for all the different models may then be compared to select the optimal model.

Example Model Comparison Results

Figure 5:
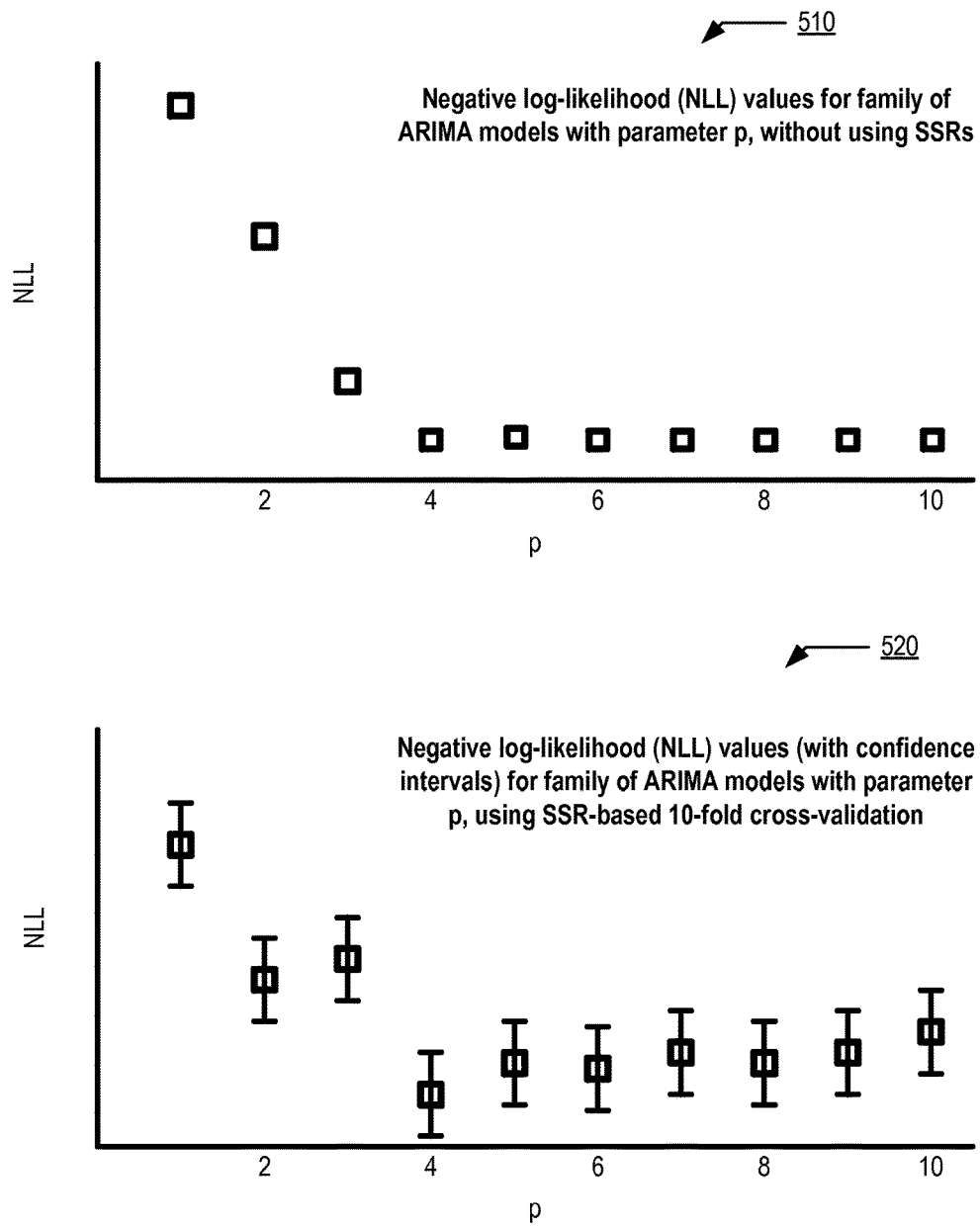
FIG. 5 illustrates examples of results of model comparison efforts with and without SSR-based cross-validation, according to at least some embodiments.

In many cases, the SSR-based cross-validation technique outlined above may provide a more systematic and clear-cut rationale for selecting an optimal model from a family of models than would have been available without using cross-validation. FIG. 5 illustrates examples of results of model comparison efforts with and without SSR-based cross-validation, according to at least some embodiments. In graph 510, example negative log-likelihood values which may be obtained for a family of ARIMA models for a hypothetical TSS are shown. (The TSS is described as hypothetical in that the results shown may not correspond to any particular real-world time series sequence.) Negative log-likelihood values of the kind plotted in graph 510 may be estimated or calculated using various approaches in different implementations—e.g., using the ARIMA models themselves, or using SSRs but without employing out-of-sample cross-validation iterations (as described above with respect to FIG. 3, FIG. 4a and FIG. 4b) in which some observations are replaced by missing values. The models of the family have different values of a parameter "p" (where "p" is the first of three numerical values that collectively comprise the "order" parameter in an R-based implementation or ARIMA). Integer values of "p" from 1 through 10 are used, and the ten corresponding negative log-likelihood values are plotted in graph 510 as one example of a quality metric that may be estimated. Lower negative log-likelihood values are preferred to higher values, so the model with the minimum log-likelihood value (if such a minimum can be found) may theoretically be selected as the optimal model of the family. As might be expected, the value of the log-likelihood decreases (gets better) sharply initially as p is increased from 1 in graph 510, but then appears to fluctuate around a plateau level after p=4. Using graph 510, the selection of the optimal member of the ARIMA model family may not be straightforward.

In graph 520, example values for the same quality metric (negative log-likelihood) obtained for the same underlying TSS using 10-fold SSR-based cross-validation are plotted, together with confidence intervals obtained from the results of the 10 folds in each case. As shown, the cross-validation results indicate a clearer choice for the optimum model: the model with p=4. (Of course, depending on the underlying data, a clear optimum may not always be found, even when the cross-validation technique is used). The fact that confidence intervals for model quality metrics may be obtained using the SSR-based cross-validation approach may further enhance the utility of the approach. It is noted that the points plotted in FIG. 5 are not intended to imply that similar results would necessarily be obtained for any particular time series sequence or any particular family of models; instead, FIG. 5 is provided simply to illustrate the kinds of benefits that may accrue at least in some scenarios if the SSR-based cross-validation technique is used.

SSR-Based Cross-Validation at a Machine Learning Service

Figure 6:
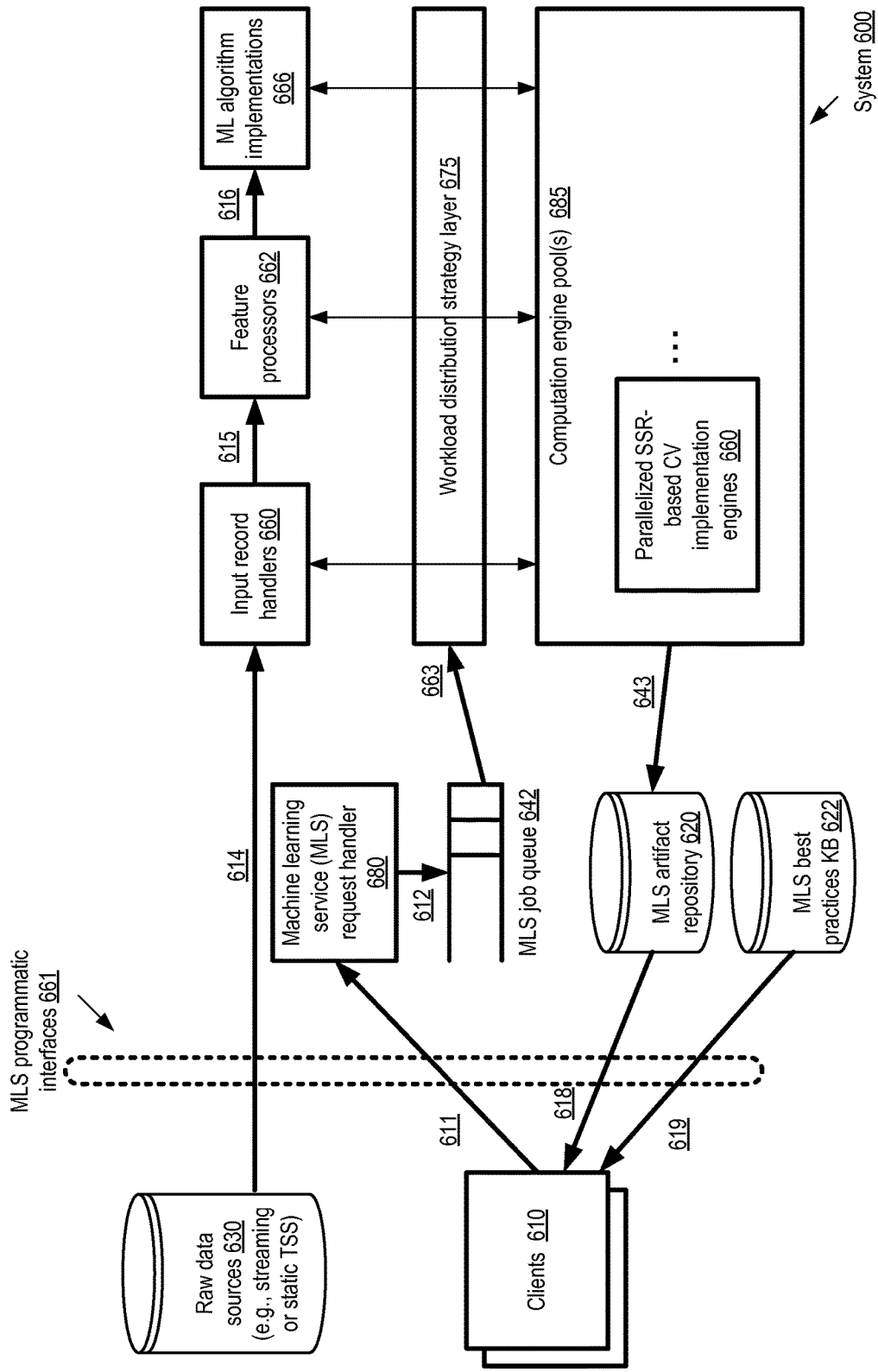
FIG. 6 illustrates example components of a machine learning service which may implement SSR-based cross-validation for time series data, according to at least some embodiments.

Various phases of the SSR-based cross-validation technique discussed herein may be appropriate for parallel implementation. For example, the cross-validation iterations for different models may be performed in parallel (e.g., on different servers or by different threads or processes) in some embodiments. It may also be possible to perform individual cross-validation iterations for the same model in parallel in some embodiments. In some embodiments, a network-accessible machine learning service implemented at a provider network may be used for at least a portion of the computations involved in SSR-based cross-validation. FIG. 6 illustrates example components of a machine learning service (MLS) which may implement SSR-based cross-validation for time series data, according to at least some embodiments.

In system 600 of FIG. 6, the MLS may include a plurality of computation engines organized into one or more pools 685. At least some of the computation engines (such as engines 660) may be used to implement a parallelized version of the SSR-based cross-validation approach. The time series data (or pointers to sources of the time series data) may be received at the MLS via programmatic interfaces 661 from clients 610 in the depicted embodiment. Any of a variety of programmatic interfaces may be used in different embodiments, such as APIs, command-line tools, web pages, or standalone GUIs. In general, the programmatic interfaces 661 may also be used by the clients to submit requests 611 for a variety of machine learning or statistics-related tasks or operations. The administrative or control plane portion of the MLS may include MLS request handler 680, which accepts the client requests 611 and inserts corresponding job objects into MLS job queue 642, as indicated by arrow 612. In general, the control plane of the MLS may comprise a plurality of components (including the request handler, workload distribution strategy selectors, one or more job schedulers, metrics collectors, and modules that act as interfaces with other services). The data plane of the MLS may include, for example, at least a subset of the servers of pool(s) 685, storage devices that are used to store input data sets including time series sequences, intermediate results or final results (e.g., model evaluation results of the kinds discussed above), and the network pathways used for transferring client input data and results.

Requests to perform SSR-based cross-validation iterations on a family of forecasting models, and/or to generate the models themselves, may be translated into one or more units of work called "jobs" in the depicted embodiment, with corresponding job objects being generated and stored in the job queue 642. Jobs may be removed from job queue 642 by a component of a workload distribution strategy layer 675, as indicated by arrow 613, and a processing plan may be identified for each such job. The workload distribution strategy layer 675 may determine the manner in which the lower level operations of the job are to be distributed among one or more computation engines selected from pool 685, and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 620 in some embodiments, as indicated by arrow 643.

A client request 611 may indicate one or more parameters that may be used by the MLS to perform the operations, such as a data source definition (which may indicate a source for a time series sequence), a feature processing transformation recipe, or parameters to be used for a particular machine learning algorithm. Some machine learning workflows, which may correspond to a sequence of API requests from a client 610 may include the extraction and cleansing of input data records from raw data repositories 630 (e.g., repositories indicated in data source definitions) by input record handlers 660 of the MLS, as indicated by arrow 614. In at least some embodiments, the input data reaching the MLS may be encrypted or compressed, and the MLS input data handling machinery may have to perform decryption or decompression before the input data records can be used for machine learning tasks. For some types of machine learning requests, the output produced by the input record handlers may be fed to feature processors 662 (as indicated by arrow 615), where a set of transformation operations may be performed in accordance with various transformation recipes, e.g., using another set of resources from pool 685. The output 616 of the feature processing transformations may in turn be used as input for a selected machine learning algorithm 666, which may be executed using yet another set of resources from pool 685. A wide variety of machine learning algorithms may be supported natively by the MLS in addition to the SSR-based cross-validation technique described earlier, including for example random forest algorithms, neural network algorithms, stochastic gradient descent algorithms, and the like. In at least one embodiment, the MLS may be designed to be extensible—e.g., clients may provide or register their own modules (which may be specified as user-defined functions) for input record handling, feature processing, or for implementing additional machine learning algorithms than are supported natively by the MLS.

In the embodiment depicted in FIG. 6, the MLS may maintain knowledge base 622 containing information on best practices for various tasks, including for example the kinds of optimal model selection techniques described above. Such knowledge base entries may be used, for example, to select modeling methodologies for time series, to select the particular cross-validation approach (e.g., the value of K for K-fold cross-validation, or the value of p for leave-p-out cross-validation) to be used. Entries may be added into the best practices KB 622 by various control-plane components of the MLS, e.g., based on results of earlier operations, client feedback, and so on. In at least some embodiments, clients 610 may access the contents of the KB 622 and/or the ML repository 620 using programmatic interfaces 661, as indicated by arrows 619 and 618.

Methods for Selecting Optimal Time Series Models

Figure 7:
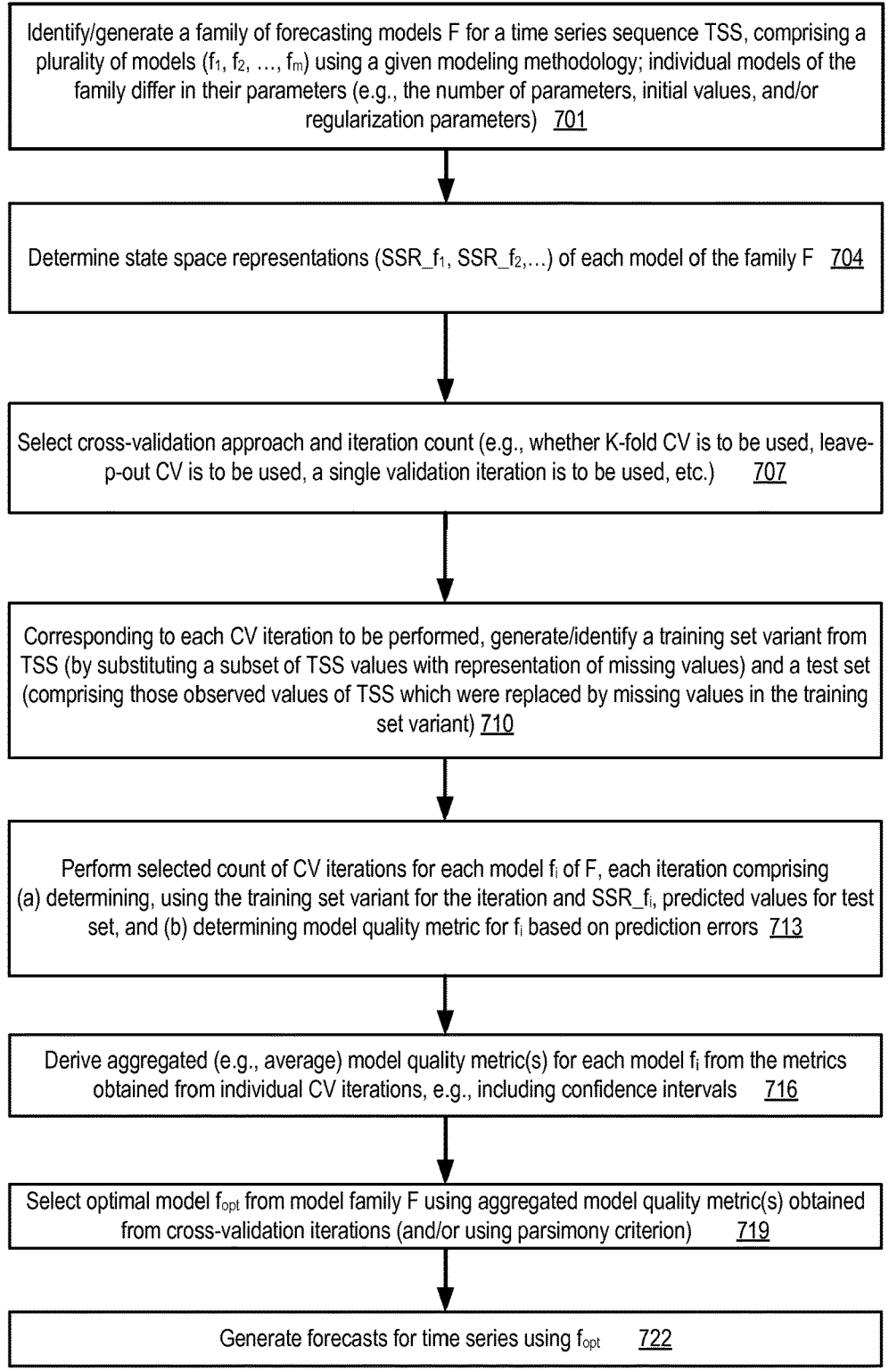
FIG. 7 is a flow diagram illustrating aspects of operations that may be performed to select an optimal forecasting model from among a family of related time series forecasting models, according to at least some embodiments.

FIG. 7 is a flow diagram illustrating aspects of operations that may be performed to select an optimal forecasting model from among a family of related time series forecasting models, according to at least some embodiments. A family F of forecasting models ($f_1, f_2, \ldots, f_m$) may be generated for a time series sequence TSS (element 701). The models of the family may all use the same methodology (e.g., autoregressive modeling, moving average modeling, exponential smoothing, seasonal/periodic modeling, combinations of such approaches such as ARIMA, and so on) and may all have the same general structure, but may differ in their parameters. For example, either the number of parameters incorporated, parameter values used, or both the number and the values may differ from one model to another. The models of the family may differ from one another in initial values and/or regularization parameters in at least some embodiments. Respective state space representations ($SSR\_f_1, SSR\_f_2, \ldots, SSR\_f_m$) corresponding to each of the models of F may then be generated (element 704), using any of a variety of mechanisms or tools (such as pre-existing library functions provided by a machine learning service or statistics package) which may be available in the computing environment being used.

A cross-validation approach and iteration count may be selected (element 707) for the TSS. For example, a decision as to whether to use K-fold cross-validation (and if so, the value of K) or leave-p-out cross-validation (and if so, the value of p) may be made. In some embodiments, a knowledge base (such as best practices KB 622 of FIG. 6) may be used to select a promising cross-validation approach, e.g., based on the kind of source from which the TSS is collected, based on records of previous successful analyses, and so on. Corresponding to each cross-validation iteration that is to be performed, a respective training set variant of the TSS may be generated and stored (element 710) in the depicted embodiment. The variant may include the original observed values of the TSS in a subset of the entries, and representations of missing values in the remainder of the entries (e.g., a token such as "N/A", "na", " " (null), " " (white space), "-", or the like may be used, indicating that the value of the observed variable for the entry is not known). In at least some embodiments, a corresponding test set variant, which includes those values that were substituted by missing value representations in the training variant, may also be generated or stored.

The selected number of cross-validation (CV) iterations may then be performed for each model of the family (element 713) in the depicted embodiment. In a given iteration, for a given model fi, the corresponding SSR (SSR_fi) and the training set variant selected for the iteration may be used to obtain predictions for the test set (i.e., for those entries in the training set variant that were replaced with missing values). The predictions may then be compared to the observed values in the corresponding entries of the test set (or the original TSS) to obtain a model quality metric for the (iteration, model) combination. Thus, for example, if 10-fold cross validation is used and there are six models in the family, a total of 60 model quality metrics may be obtained, 10 for each of the six models. Any of a variety of quality metrics may be obtained in different embodiments, such as various likelihood or log-likelihood metrics, one-step ahead mean squared forecast error (1-MSFE) metrics, k-step ahead mean squared forecast error (k-MSFE) metrics, or one-step ahead mean absolute forecast percentage error (1-MAFPE) metrics. In some implementations, more than one metric may be obtained for each CV iteration.

From the set of CV-iteration-specific model quality metrics obtained for each model being evaluated, one or more aggregate model quality metrics may then be derived (element 716) (e.g., by simply taking the mean value). In at least some implementations, a confidence interval around the aggregated metric may also be computed from the per-iteration metrics. Comparing the aggregated metrics, an optimal model $f_{opt}$ may be selected from the family (element 719). Depending on the kind of quality metric being used, the model with either the highest numerical value for the aggregated quality metric in the family, or the lowest numerical value, may be identified as the optimal model. In at least one embodiment, a parsimony criterion may be used to identify the optimal model (e.g., in addition to the comparison of the aggregate metrics). According to one such parsimony criterion, from among a group of models with similar aggregate quality metric values, the least complex model (e.g., where complexity is assumed to be proportional to the number of parameters incorporated in the model) may be identified as the optimal model. After an optimal model has been identified, it may be used for subsequent forecasts for the TSS (element 722). As mentioned earlier, the optimal model may also or instead be used for various other purposes, such as determining or estimating the relative impacts of different parameters of the model, the variation in the model's output as the value of a particular parameter is changed, the relative significance of different input variables, and so on.

It is noted that in various embodiments, some of the kinds of operations shown in FIG. 7 may be implemented in a different order than that shown in the figure, or may be performed in parallel rather than sequentially. For example, the selection of the cross-validation approach (element 707) may precede the generation of the SRSs (element 704) in some embodiments. As mentioned earlier, many of the operations involved in the SSR-based cross-validation procedure illustrated in FIG. 7 may be suited to parallelization. For example, in various embodiments, some number of CV iterations for a given model may be performed in parallel (either using separate servers or computation engines, or using different threads within a given server or computation engine), or iterations for different models may be performed in parallel. In some embodiments, some of the operations shown in FIG. 7 may not be implemented, or additional operations not shown in FIG. 7 may be performed.

Use Cases

The SSR-based cross-validation approach towards forecasting model selection for time series data described above may be useful in a variety of scenarios. For example, the technique may be used for forecasting retail sales, for predicting demand for various commodities, for econometric problems, for weather forecasting, for medical diagnosis, and so on. The technique may be applied at various scales and with various levels of parallelism: e.g., by a data scientist running small-scale predictions on a single laptop, or at a web-scale machine learning service implemented using tens of thousands of geographically-distributed computation engines capable of simultaneously running all the cross-validation iterations. Forecasts corresponding to real-time data streams, such as observations collected by various scientific instruments or sensors in seismically sensitive zones, satellites, automobiles, trains, airplanes and the like may all be generated in a more systematic and rigorous manner than would have been possible without using the state space approach.

Illustrative Computer System

Figure 8:
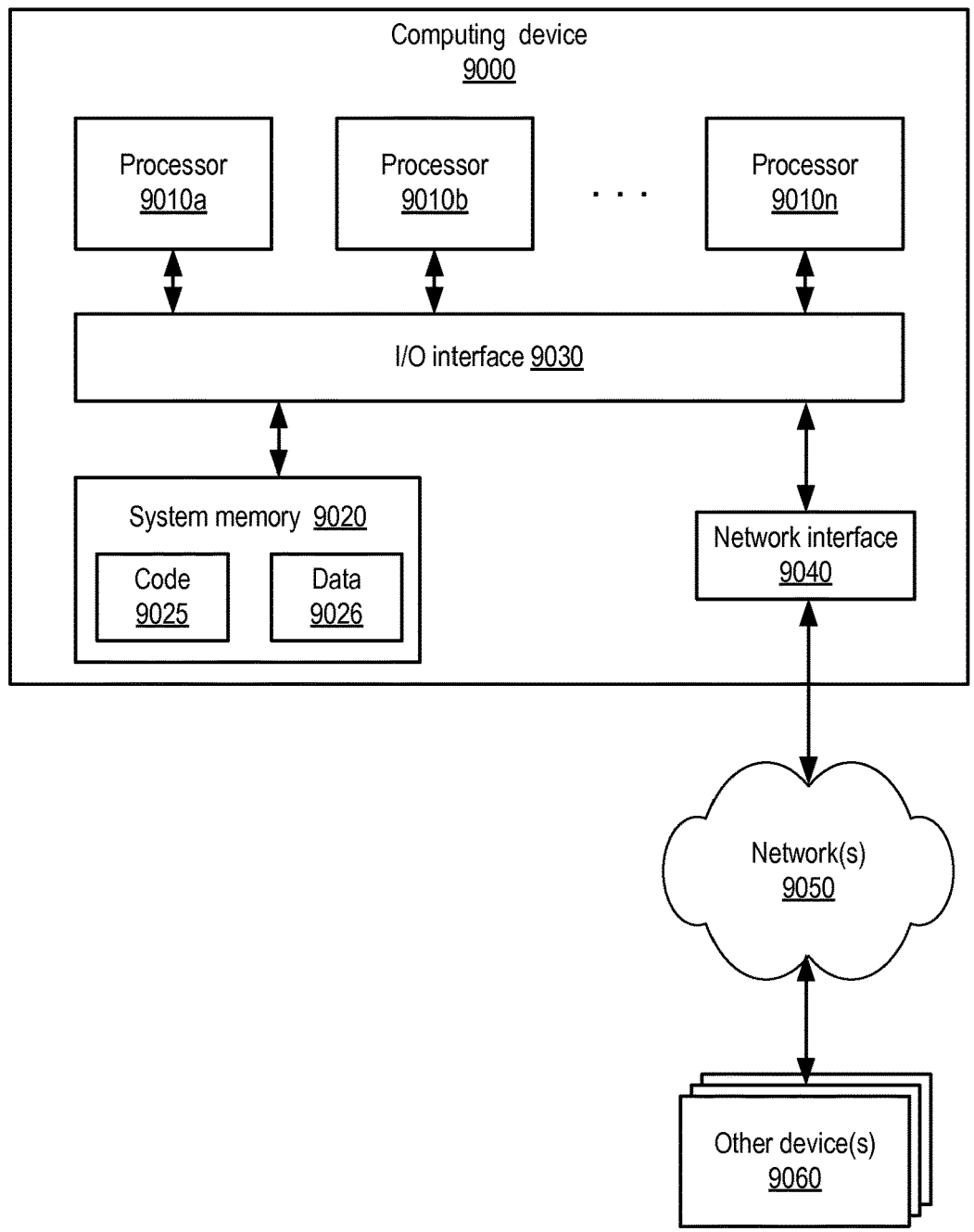
FIG. 8 is a block diagram illustrating an example computing device that may be used in at least some embodiments.

In at least some embodiments, a server that implements one or more of the techniques described above for selecting optimal time series models using SSR-based cross-validation may include a general-purpose computer system that includes or is configured to access one or more computer-accessible media. FIG. 8 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG.

1 through FIG. 7, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a machine learning service comprising a plurality of computing devices configured to:
        generate a model family comprising a plurality of forecasting models that implement a particular modeling methodology for a time series sequence comprising a set of observations, wherein individual ones of the forecasting models of the model family have a different set of model parameters than other forecasting models of the model family;
        generate respective state space representations corresponding to individual ones of the forecasting models of the model family;
        implement, using individual ones of the state space representations, respective sets of cross-validation iterations, wherein a particular set of cross-validation iterations corresponds to a respective forecasting model of the model family, and wherein the particular set of cross-validation iterations includes operations to:
            determine a particular training variant of the time series sequence, wherein the particular training variant includes (a) in positions indexed by a particular training index vector associated with the particular set of cross-validation iterations, copies of the corresponding observations of the time series sequence and (b) in positions indexed by a test index vector corresponding to the particular training index vector, representations of missing values;
            utilize the particular training variant as input for a particular state space representation corresponding to the respective forecasting model to obtain a prediction set corresponding to the test index vector; and
            compute a model quality metric for the respective forecasting model, based at least in part on differences between the predictions of the prediction set and the observations of the time series sequence indexed by the test index vector;
        automatically select, based at least in part on a comparison of model quality metrics determined for individual forecasting models of the model family, a particular forecasting model as an optimal forecasting model among the models of the model family;
        wherein said implement, using individual ones of the state space representations, of the respective sets of cross-validation iterations prior to said automatically select the particular forecasting model as the optimal forecasting model avoids training a model that is over fitted to the original data, thereby avoiding use of additional computational resources associated with training the model; and
        utilize the optimal forecasting model to generate one or more forecasts corresponding to the time series sequence comprising a real-time data stream of observations collected by one or more scientific instruments or sensors in a seismically sensitive zone, satellite, automobile, train or airplane.

2. The system as recited in claim 1, wherein the particular state space representation is expressed in innovations form.

3. The system as recited in claim 1, wherein the particular set of cross-validation iterations comprises a K-fold cross-validation procedure, in which K different training variants of TSS are generated, K initial measures of model quality are generated, and the model quality metric is obtained by aggregating the K initial quality metrics.

4. The system as recited in claim 1, wherein the particular modeling methodology comprises one or more of: (a) autoregressive modeling, (b) moving average modeling, (c) seasonal modeling, (d) periodic modeling, (e) regression modeling, or (f) exponential smoothing.

5. The system as recited in claim 1, wherein the model quality metric for the respective forecasting model comprises one or more of: (a) a likelihood metric, (b) a one-step ahead mean squared forecast error (1-MSFE) metric, (c) a k-step ahead mean squared forecast error (k-MSFE) metric, or (d) a one-step ahead mean absolute forecast percentage error (1-MAFPE).

6. A method, comprising:
performing, by one or more computing devices:
generating respective state space representations of a plurality of forecasting models of a model family, wherein individual ones of the plurality of forecasting models utilize a particular modeling methodology for a time series sequence comprising a plurality of observations;
implementing, using individual ones of the state space representations, respective sets of cross-validation iterations, wherein a particular set of cross-validation iterations corresponds to a respective forecasting model of the model family and includes:
identifying a test subset and a training subset of the plurality of observations of the time series sequence;
obtaining, using a variant of the time series sequence as input to a particular state space representation corresponding to the respective forecasting model, predictions for the test subset, wherein within the variant, the test subset is replaced by missing values; and
computing a model quality metric for the respective forecasting model based at least in part on differences between the predictions and the test subset; and
automatically selecting, based at least in part on a comparison of model quality metrics determined for individual forecasting models of the model family, a particular forecasting model as an optimal forecasting model among the models of the model family;
wherein said implementing, using individual ones of the state space representations, of the respective sets of cross-validation iterations prior to said automatically selecting the particular forecasting model as the optimal forecasting model avoids training a model that is over fitted to the original data, thereby avoiding use of additional computational resources associated with training the model.

7. The method as recited in claim 6, further comprising performing, by the one or more computing devices:
utilizing the optimal forecasting model for one or more of:
(a) generating one or more forecasts corresponding to the time series sequence, (b) determining relative impacts, on an output variable generated by the optimal forecasting model, of a first and a second parameter of the optimal forecasting model, (c) determining an impact, on an output variable generated by the optimal forecasting model, of varying a value of a particular parameter of the optimal forecasting model, or (d) determining relative impacts, on an output variable generated by the optimal forecasting model, of a first and a second input variable of the optimal forecasting model.

8. The method as recited in claim 6, wherein a first forecasting model of the model family differs from another forecasting model of the model family in one or more of: (a) an initial value parameter, (b) a regularization parameter, or (c) a number of model parameters.

9. The method as recited in claim 6, wherein the particular state space representation is expressed in innovations form.

10. The method as recited in claim 6, wherein the particular set of cross-validation iterations comprises a K-fold cross-validation procedure.

11. The method as recited in claim 6, wherein the particular set of cross-validation iterations comprises an exhaustive leave-p-out cross-validation procedure.

12. The method as recited in claim 6, wherein the particular modeling methodology comprises one or more of: (a) autoregressive modeling, (b) moving average modeling, (c) seasonal modeling, (d) periodic modeling, (e) regression modeling, or (f) exponential smoothing.

13. The method as recited in claim 6, wherein the model quality metric comprises one or more of: (a) a likelihood metric, (b) a one-step ahead mean squared forecast error (1-MSFE) metric, (c) a k-step ahead mean squared forecast error (k-MSFE) metric, or (d) a one-step ahead mean absolute forecast percentage error (1-MAFPE).

14. The method as recited in claim 6, wherein said selecting the particular forecasting model as the optimal model is based at least in part on a parsimony criterion.

15. The method as recited in claim 6, further comprising:
receiving an indication of one or more forecasting models of the model family at a component of a machine learning service implemented at a provider network, wherein the machine learning service comprises a plurality of computation engines, wherein individual ones of the plurality of computation engines comprise one or more threads of execution; and
deploying a first computation engine and a second computation engine of the plurality of computation engines to determine, in parallel, respective model quality metrics of a first model and a second model of the one or more forecasting models.

16. The method as recited in claim 6, further comprising:
receiving an indication of the respective forecasting model at a component of a machine learning service implemented at a provider network, wherein the machine learning service comprises a plurality of computation engines, including a first computation engine and a second computation engine, wherein individual ones of the plurality of computation engines comprise one or more threads of execution; and
deploying the first computation engine to implement a first cross-validation iteration of the particular set of cross-validation iterations, and the second computation engine to implement a second cross-validation iteration of the particular set of cross-validation iterations.

17. The method as recited in claim 6, further comprising performing, at the one or more computing devices:
receiving, prior to said generating the state space representations, one or more observations of the time series sequence via a programmatic interface for streaming real-time data.

18. A non-transitory computer-accessible storage medium storing program instructions that when executed on one or more processors:

generate respective state space representations of a plurality of forecasting models of a model family, wherein individual ones of the plurality of forecasting models utilize a particular modeling methodology for a time series sequence comprising a plurality of observations;

implement, using individual ones of the state space representations, respective sets of cross-validation iterations, wherein a particular set of cross-validation iterations corresponds to a respective forecasting model of the model family and includes:
- identifying a test subset and a training subset of the plurality of observations of the time series sequence;
- obtaining, using a variant of the time series sequence as input to a particular state space representation corresponding to the respective forecasting model, predictions for the test subset, wherein within the variant, the test subset is replaced by missing values; and
- computing a model quality metric for the respective forecasting model, based at least in part on differences between the predictions and the test subset; and automatically select, based at least in part on a comparison of model quality metrics determined for individual forecasting models of the model family, a particular forecasting model as an optimal forecasting model among the models of the model family;

wherein said implement, using individual one of the state space representations, of the respective sets of cross-validation iterations prior to said automatically select the particular forecasting model as the optimal forecasting model avoids training a model that is over fitted to the original data, thereby avoiding use of additional computational resources associated with training the model.

19. The non-transitory computer-accessible storage medium as recited in claim 18, wherein a particular forecasting model of the model family differs from another forecasting model of the model family in one or more of: (a) an initial value parameter, (b) a regularization parameter, or (c) a number of model parameters.

20. The non-transitory computer-accessible storage medium as recited in claim 18, wherein the particular modeling methodology comprises one or more of: (a) autoregressive modeling, (b) moving average modeling, (c) seasonal modeling, (d) periodic modeling, (e) regression modeling, or (f) exponential smoothing.

21. The non-transitory computer-accessible storage medium as recited in claim 18, wherein the model quality metric comprises one or more of: (a) a likelihood metric, (b) a one-step ahead mean squared forecast error (1-MSFE) metric, (c) a k-step ahead mean squared forecast error (k-MSFE) metric, or (d) a one-step ahead mean absolute forecast percentage error (1-MAFPE).

* * * * *